United States Patent [19]
Sliva et al.

[11] 3,928,516
[45] Dec. 23, 1975

[54] CONTINUOUS METHOD FOR MAKING SPINNABLE POLYACETYLENE SOLUTIONS CONVERTIBLE TO HIGH STRENGTH CARBON FIBER

[75] Inventors: Daniel E. Sliva, Pittsfield, Mass.; William G. Selley, Schenectady, N.Y.

[73] Assignee: General Electric Company, Schenectady, N.Y.

[22] Filed: Nov. 30, 1972

[21] Appl. No.: 310,989

[52] U.S. Cl. ............. 264/29; 260/47 UA; 260/94.1; 264/205; 264/211; 264/DIG. 19; 427/447
[51] Int. Cl.[2] ......................... D01D 5/04; B05B 3/00
[58] Field of Search ............. 260/94.1, 29.1, 88.2 C, 260/47 UA, 93.5 R; 264/176 F, 211, 205, 29, DIG. 19; 423/447

[56] References Cited
UNITED STATES PATENTS

| | | | |
|---|---|---|---|
| 1,812,541 | 6/1931 | Nieuwland | 260/941 |
| 1,876,857 | 9/1932 | Calcott et al. | 260/941 |
| 1,924,979 | 8/1933 | Calcott et al. | 260/941 |
| 3,032,384 | 5/1962 | Riley et al. | 264/205 |
| 3,083,125 | 3/1963 | Bohlmann et al. | 260/94.1 |
| 3,119,799 | 1/1964 | Natta et al. | 260/94.1 |
| 3,300,456 | 1/1967 | Hay | 260/94.1 |
| 3,332,916 | 7/1967 | Hay | 260/94.1 |
| 3,354,137 | 11/1967 | Ohrodnik et al. | 260/94.1 |
| 3,705,131 | 12/1972 | Vladimivovich et al. | 260/88.2 C |
| 3,709,863 | 1/1973 | White et al. | 423/447 |
| 3,748,305 | 7/1973 | White et al. | 260/47 UA |
| 3,749,700 | 7/1973 | Stephens et al. | 260/93.5 R |
| 3,809,673 | 5/1974 | White et al. | 423/447 |
| 3,816,374 | 6/1974 | White | 260/47 UA |
| 3,821,153 | 6/1974 | White | 260/33.6 UA |

*Primary Examiner*—Jay H. Woo
*Attorney, Agent, or Firm*—William A. Teoli; Joseph T. Cohen; Jerome C. Squillaro

[57] ABSTRACT

A continuous method is provided for making polyacetylene fiber convertible to high strength carbonaceous products. A thin film evaporator is employed to devolatilize the reaction mixture at the termination of the oxidative coupling of diethynyl organo compounds. The concentrated reaction mixture can be spun into polyacetylene fibers in a continuous manner. The spun concentrate can be collected and employed to make graphite fibers useful in making composites.

8 Claims, 1 Drawing Figure

POLYMERIZATION REACTOR
THIN FILM EVAPORATOR
VOLATILES
MULTIFILAMENT EXTRUSION
PACKAGING
STORAGE
DRAWING AND HEAT TREATMENT
GRAPHITIZATION
PACKAGING
STORAGE

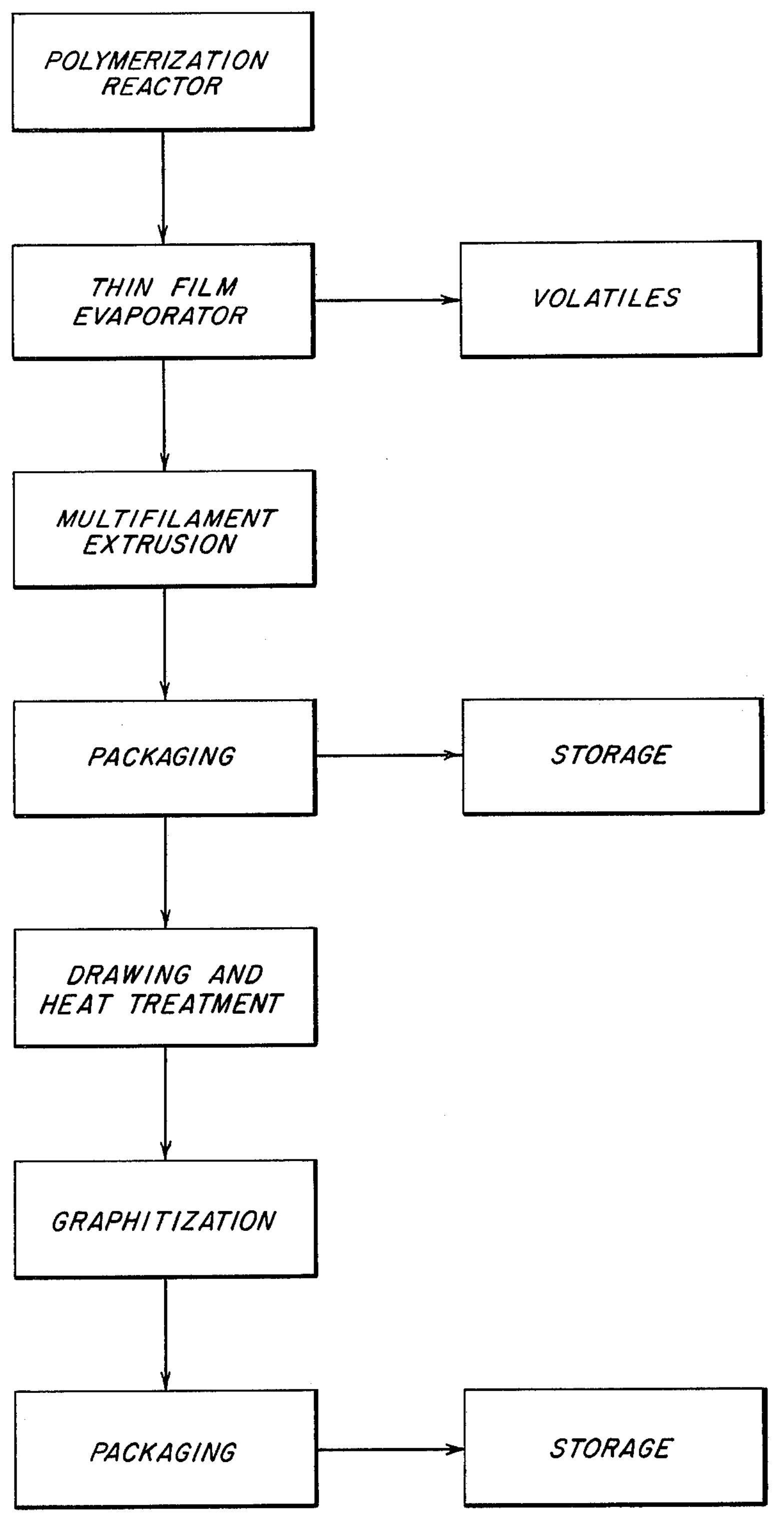
POLYMERIZATION REACTOR
THIN FILM EVAPORATOR
VOLATILES
MULTIFILAMENT EXTRUSION
PACKAGING
STORAGE
DRAWING AND HEAT TREATMENT
GRAPHITIZATION
PACKAGING
STORAGE

CONTINUOUS METHOD FOR MAKING SPINNABLE POLYACETYLENE SOLUTIONS CONVERTIBLE TO HIGH STRENGTH CARBON FIBER

The present invention relates to a continuous method for making polyacetylene fiber convertible to high strength carbon fiber. More particularly, the present invention relates to the use of a thin film evaporator to devolatilize the reaction mixture of oxidatively coupled diethynyl organo compounds and the concentrate can be spun to produce polyacetylene fiber.

As taught in Hay U.S. Pat. No. 3,300,456 assigned to the same assignee as the present invention, polyacetylene solutions can be converted to fiber which can later be decomposed to form carbonaceous material. Among the carbonaceous materials which can be made by the aforementioned method of Hay is high strength graphite as taught in copending application of D. E. Sliva et al, Ser. No. 86,295, filed Nov. 2, 1970, and now abandoned assigned to the same assignee as the present invention.

Prior to the present invention, polyacetylene fiber was made by extruding a blend of polyacetylene and an organic solvent such as orthodichlorobenzene. In accordance with the teaching of the aforementioned Hay patent, polyacetylene can be made by the oxidative coupling of a diethynyl organo compound using an amine-basic cupric salt complex as a catalyst. The catalyst can be removed or destroyed to terminate oxidative coupling reaction. A mineral acid can be added to the reaction mixture to destroy the catalyst. The reaction mixture also can be filtered or poured into a material which is a solvent for the catalyst system but an anti-solvent for the polymer. After the catalyst is destroyed, the polyacetylene can be redissolved in a suitable organic solvent to form an extrudable blend.

The catalyst removal or destruction step of Hay provides valuable results. However, it would be desirable to eliminate the step of precipitating the polyacetylene from the oxidative coupling reaction mixture to rid the polymer of impurities. It would also be desirable to avoid having to redissolve dry polyacetylene to make a solution for making fiber. It would be advantageous to provide a truly continuous method for making polyacetylene fiber.

The present invention is based on the discovery that polyacetylene solutions useful for making polyacetylene fiber and high strength graphite can be made by directly devolatilizing the oxidative coupling reaction mixture at the termination of the polyacetylene polymerization reaction to provide a spinnable concentrate. The spinnable concentrate can be spun in a continuous manner. Surprisingly, it has been found that polyacetylene fiber derived directly from the aforementioned oxidatively coupled concentrate exhibits superior properties over fiber made from extruded polyacetylene derived from oxidatively coupled diethynyl organo compound reaction mixture which had been poured into a non-solvent for the polyacetylene. A further unexpected result is that polyacetylene fiber derived directly from the oxidatively coupled concentrate often can be graphitized at temperatures substantially below the temperature used to graphitize extruded polyacetylene fiber of the prior art.

There is provided by the present invention a continuous process for making polyacetylene fiber which comprises, 1. producing polyacetylene solution having at least 3% polymer solid by the oxidative coupling of diethynylorgano compounds,
2. passing said polyacetylene solution through a thin film evaporator to produce a spinnable polyacetylene concentrate having a solids concentration of up to about 33% by weight.
3. spinning said polyacetylene concentrate,
4. and collecting the resulting polyacetylene fiber.

As shown in the drawing, devolatilization of the reaction mixture can be achieved with a thin film evaporator. An example of a thin film evaporator which can be used is shown by Baird et al U.S. Pat. No. 3,357,479. Others are shown by Gabler U.S. Pat. No. 2,687,552, Mayer U.S. Pat. No. 2,737,081, Agert et al U.S. Pat. No. 3,252,502, etc. After leaving the thin film evaporator, the oxidatively coupled concentrate can be filtered and led into a multi-filament spinning die. Spun fiber can be collected and stored if desired. The polyacetylene fiber also can be employed in a continuous manner to make high strength graphite after it has been properly drawn and heat stabilized.

In the practice of the invention, polyacetylene can be made by the oxidative coupling of diethynyl organic compounds as described in Hay U.S. Pat. Nos. 3,300,456 and 3,597,175 assigned to the same assignee as the present invention. Some of the reactants, catalysts, and the conditions utilized in the present method for making the polyacetylene by oxidative coupling are set forth in the aforementioned Hay patents which are incorporated herein by reference.

Among the preferred polyacetylenes which can be made by oxidative coupling of diethynyl organo compounds are terpolymers of p-diethynylbenzene, o-diethynylbenzene and dipropargyl ethers of dihydric phenol such as bisphenol A. Typical solvents are for example, o-dichlorobenzene, p-dichlorobenzene, chlorinated aromatic hydrocarbons such as aroclors, etc. Additional examples of polyacetylene which can be used in the practice of the invention are shown in copending applications of C. M. Krutchen, Ser. No. 86,280, filed Nov. 2, 1970, and the aforementioned application of D. E. Sliva both assigned to the same assignee as the present invention.

At the termination of the oxidative coupling reaction, the resulting mixture has a solids content of from 3 % to 10% by weight to provide a viscosity of up to about 10,000 centipoises at 125°C. It has been found that a higher viscosity would not provide optimum agitation conditions in the reactor requiring higher energy inputs and resulting in uneconomic operation.

As soon as steady state conditions are achieved, the reaction mixture is pumped into the thin film evaporator. The rate at which the feed is introduced can vary widely depending upon the type of unit employed, the temperature of the jacket, the pressure used, residence time, rotor speed, thickness of film desired, etc. Experience has shown for example that the polyacetylene can crosslink or gel in the reactor unless precautions are taken. Gellation can cause a premature rise in viscosity resulting in polymer build-up problems in the thin film evaporator and interfere with continuous operation. The jacket temperature employed in the thin film evaporator can vary over a range of 100°C. to 160°C. depending upon the flow rate of the feed, rate of evaporation of solvent desired, whether an inert gas purge is employed, etc. In order to minimize gellation, a temperature of 110°C. to 130°C. is preferred.

A residence time of 1 min. to 5 min. for the feed has generally been found effective, which can be controlled by flow rate.

To minimize premature flashing off of solvent from polymer film surface which could cause gellation and/or decomposition of the polymer, it has been found expedient to employ an inert gas purge in the evaporator. The inert gas, such as nitrogen, or a noble gas for example argon has been found to minimize sharp rises in the rate of solvent evaporation. Erratic rises in solvent evaporation can be more easily controlled as the vapor pressure within the evaporator approaches boiling point of the solvent.

A rapid boiling off of the solvent is avoided because the use of an inert gas purge allows the removal of sufficient solvent at significantly higher pressure conditions. The amount of solvent take off can be directly regulated by the gas flow rate, while maintaining constant temperature and pressure through the system. A typical rate of increase in the inert gas flow rate can be, for example, 5 increments of 5SCFH i.e., standard cubic feet per hour, allowing about five minutes after each increase. This procedure can be continued until the polymer viscosity has increased to a level suitable for spinning.

Prior to spinning, it has been found desirable to pass the polyacetylene solution through a filter to remove any undesirable impurities therefrom. A millipore filter such as $5\mu$ can be used. The spinnable solution having a viscosity in the range of from 1,000 to 100,000 centipoises at 125°C. then can be passed through a multifilament spinning die to produce collectable fibers which can be thereafter stored or processed in accordance with the teaching of the aforementioned copending applications of C. M. Krutchen and D. E. Sliva et al to produce carbonaceous products including high strength graphite. In instances where the viscosity of the spinning solution is sufficiently high, for example 10,000 to 100,000 centipoises at 125°C., the spun fiber can be directly collected. Otherwise it has been found desirable to effect removal of excess solvent which can be achieved in a variety of ways.

One approach is to rapidly pass the multifilament array into a cooling bath of an anti-solvent for the polymer, such as acetone or methanol. Another approach is to allow the fibers to fall freely under non-oxidizing conditions or vacuum which can include the use of external heat, or purging the fibers with an inert gas.

The fiber can thereafter be collected and stored as a package or it can be further processed to the carbonized or graphitized state.

While the polyacetylene is being spun, a suitable fiber tension can be imposed on the fiber to "melt-draw" it down to diameters less than that of the die orifice from which the filament is spun. In accordance with standard spinning techniques, the RPM of the take-up spool, for example, is coordinated with the polymer delivery through the orifice to accomplish this regulation of diameter.

After extrusion, the polyacetylene fiber can be subjected to further processing steps prior to the stabilizing heat treatment. These steps can include for example, (1) drawing of the fiber to accomplish an increase in tensile properties and a decrease in diameter, and (2) full or partial removal of plasticizer by use of heat or extractive solvent. For example, the fiber can be spun under tension directly through a heating zone at temperatures up to about 400°C. to simultaneously effect the removal of plasticizer and heat stabilization of the polymer.

Experience has shown that sudden heating of polyacetylene fiber to temperatures above 180°C., or use of an open flame having surface temperature of greater than 700°C., particularly when employing polyacetylene fiber free of solvent, can result in explosive decomposition, or burning of the fiber. However, if the fiber is properly heat stabilized, the fiber can be exposed to temperatures up to 3300°C. without substantial loss of fiber integrity.

Heat stabilization of the fiber can be achieved by exposing it to temperatures up to about 1000°C. for a time sufficient to increase its modulus of elasticity to at least $1 \times 10^6$ psi. The polyacetylene fiber, for example, can have an elastic modulus of from about $1 \times 10^3$ psi to about $1 \times 10^4$ psi. The heat stabilized fiber can have an elastic modulus of from about $1 \times 10^6$ psi to about $3 \times 10^6$ psi. Control is accomplished by either (1) low temperature (100°–200°C.) heat treatment for long periods of time, (2) sequential treatments at increasing temperatures for shorter periods of time, or (3) flash exposure of the fiber to temperatures up to about 1000°C. For example, heat stabilization of a 1 mil polyacetylene fiber can be achieved by exposing the fiber 16 hours at 160°C., or passing the fiber over a hot pin at 310°C. for about 0.5 seconds and then through ovens at 200°C. and 300°C. for 20 secs. These heat treatments can be conducted either in the presence or absence of oxygen, i.e. in air, vacuum or in an inert gas atmosphere such as argon or nitrogen.

Unlike polymers shown in U.S. Pat. No. 3,412,062, polyacetylenes do not require a separate carbonization step prior to stress graphitization. Because weight losses due to carbonization can be minimal, diffusion problems can be avoided. This allows for the simultaneous carbonization and graphitization of the polyacetylene fiber. Although after it has been heat stabilized, the polyacetylene fiber can be advanced to temperatures up to 3300°C., while under tension to graphitize the fiber, if desired the fiber can be carbonized. As an intermediate step prior to graphitization, carbonization can be achieved at temperatures between about 600°C. to about 1500°C. in a non-oxidizing atmosphere. As previously defined, carbonization indicates conversion of the polyacetylene fiber to a product substantially free of all atoms, except carbon. Graphitization of the polyacetylene fiber can be achieved by advancing the heat stabilized fiber, while under tension in the absence of oxygen, such as by use of an inert atmosphere, employing a noble gas, vacuum, etc. to a temperature in the range of from 2000°C. to 3200°C. A fiber tension from about 3,000 psi to about $1 \times 10^5$ psi, and preferably 10,000 psi to 15,000 psi can be employed. Depending upon the temperature employed during graphitization, the residence time of the stabilized fiber in the heating zone can vary from about 15 seconds or less, to about 360 seconds or more. During the graphitization step, the fiber can be elongated up to 100% or about 25% more. As a result of the stress graphitization, a fiber is attained which can have a tensile strength of at least 25,000 psi or more, a tensile modulus of at least $20 \times 10^6$ psi or more, and a density of about 1.5 to 2.2 gm/cm$^3$.

Carbon fiber made in accordance with the method of the invention can be employed in combination with various curable organic resins, or solutions thereof to produce resin prepregs. Organic resins, which can be employed, for example, are curable polyimides, as shown by French Patent No. 1,555,564; U.S. Pat. No. 3,528,950, etc. In addition, there can be employed epoxy resins, copolymers of vinylene-fluoride and hexafluoropropylene, phenylquinoxalines, polycarbonates, etc.

In order that those skilled in the art will be better able to practice the invention, the following examples are given by way of illustration and not by limitation. All parts are by weight.

EXAMPLE 1

There is initially added into a continuous polymerization reactor, 140 ml of a 7% solution of a diethynylorgano compound mixture of 81 parts of metadiethynylbenzene, 9 parts of para-diethynyl benzene and 10 parts of bis-phenol-A dipropargyl ether to 2000 ml of a solution of oxidative coupling catalyst in o-dichlorobenzene solvent. The catalyst is prepared from about 46 parts of cuprous chloride about 500 parts of pyridine, and about 60 parts of tetramethyl ethylene diamine in accordance with the teaching of the Hay patent. During the introduction of the monomer mixture into the catalyst solution, an oxygen flow is initiated at a flow rate of 14.5 SCFH and the reactor is maintained at about 71°C. After an initial residence time of about 30 minutes, a polymer stream is pumped out of the reactor and fresh monomer stream is pumped into the reactor at a concentration of 9%.

After steady state conditions have been achieved, the above oxidatively coupled reaction mixture is then pumped into a thin film evaporator, such as shown by Baird et al U.S. Pat. No. 3,357,419. The thin film evaporator is operated at a temperature of about 105°C. and a pressure of between 100–140 mm. An average residence time of about five minutes is maintained using a flow rate of about 50 cc/min.

A solution is continuously collected from the thin film evaporator having about 12% to 14% polymer solids. The solution is filtered through a high pressure millipore assembly having a screen pack containing an array of 2–200 mesh screens and 2–400 mesh screens. The filtered solution having a viscosity of about 10,000 centipoises at 125°C. is extruded through an 18-hole, 10 mil die. The resulting fibers are continuously passed at diameters of from 1.5 to 2.0 mil are allowed to fall freely into an acetone bath and thereafter continuously collected. The extruded fibers are found to be translucent.

The fiber tow is then heat treated by passing it at a rate of 4.5 ft/min over two shoes at 260°C. and 360°C., respectively. The heat treated fiber is found to have a tensile strength of about 60,000 psi. The heat treated fiber is then carbonized at 1100°C. and graphitized using a constant strain roll to roll technique. The speed differential between take up and feed rolls is 2:1 with the fiber entering an induction furnace at 2500°C. Residence time in the furnace is approximately 2 minutes. Tensile strength of the resulting graphite are found to be 225,000 to 311,000 psi and modulus is 50–70 × $10^6$ psi.

EXAMPLE 2

A polyacetylene is continuously prepared utilizing a mixture of about 7 parts metadiethynylbenzene and about 1 part of paradiethynyl benzene. Copolymerization is achieved by oxidative coupling utilizing a mixture of cuprous chloride, N,N,N',N'-tetramethyethylenediamine and pyridine, as described above in Example 1. There is obtained a polyacetylene consisting essentially of chemically combined metadiethynylbenzene units and paradiethynyl benzene units.

After steady state conditions are achieved a 9% by weight solids mixture is pumped into a thin film evaporator as described in Example 1. The temperature of the evaporator is maintained at about 130°C. The mixture is fed into the evaporator at a rate sufficient to achieve about a 5 minute residence time. A solution is continuously collected from the evaporator having a solids concentration of about 33% and a viscosity of about 100,000 centipoises at 125°C.

The solution is filtered as described in Example 1 and spun through an 18-hole, 10 mil die. Fibers having diameters of 1.5 to 2 mil are allowed to fall freely and continuously collected. The tow is then heat treated and graphitized as in Example 1. Fiber having an average tensile strength of 250,000 psi and an average elastic modulus of 5.0 × $10^6$ psi are obtained.

A bundle of about 20 graphitized carbon fibers, made in accordance with Example 1, having an average diameter of about 0.8 mil and a length of about 6 inches is clamped in a horizontal position. The bundle is then treated with a 10% solution of an epoxy resin in methyethyl ketone employing a micro pipette. The treated fibers are then placed into an oven at 60°C. for 45 seconds to effect the evaporation of the solvent. There is obtained a prepreg which is cut into 1½ inch pieces. The epoxy resin employed contains as essential ingredients a bis-phenol epichlorohydrin reaction product, and a methyl nadicanhydride curing agent.

The above 1½ inch prepregs are put into a cold mold and cured under 600 psi for 1 hour at 150°C. and 16 hours at 175°C. in an air oven. There is obtained a composite exhibiting valuable characteristics and useful for making high strength laminates and molded parts.

Based upon the above examples, those skilled in the art would know that carbon fibers produced in accordance with the method of the present invention, can be employed in a variety of applications requiring the services of a high strength, high modulus material such as in the production of parts used in aircraft manufacturing, etc.

What we claim as new and desire to secure by Letters Patent in the U.S. Patent Office is:

1. A continuous process for making polyacetylene fiber which comprises:

1. producing a polyacetylene solution having at least 3% polymer solids by weight by the oxidative coupling of diethynyl organo compounds, selected from the class consisting of metadiethynylbenzene, para-diethynylbenzene and bis-phenol-A dipropargyl ether and a mixture of metadiethynylbenzene and para-diethynylbenzene,
2. passing said polyacetylene solution through a thin film evaporator to produce a solution spinnable polyacetylene concentrate having a solids concentration of up to about 33% by weight,
3. spinning said polyacetylene concentrate, 4. and collecting the resulting polyacetylene fiber.

2. A process in accordance with claim 1, where the polyacetylene consists of chemically combined meta-diethynyl benzene units, paradiethynyl benzene units, and dipropargyl ether bis-phenol A units.

3. A method in accordance with claim 1, where there is employed an inert gas purge in the thin film evaporator while passing said polyacetylene solution therethrough.

4. A method in accordance with claim 1, where said spun polyacetylene concentrate is passed into an organic solvent after it has been spun and before it is collected.

5. A method in accordance with claim 1, where said polyacetylene concentrate is allowed to fall freely in a non-oxidizing atmosphere immediately after it has been spun and before it has been collected.

6. A method in accordance with claim 1, where said collected polyacetylene fiber is heat stabilized at a temperature up to 1000°C.

7. A method for making high strength graphite which comprises making a polyacetylene fiber in accordance with claim 1, heat stabilizing said fiber at a temperature up to 1000°C. and thereafter graphitizing said heat stabilized fiber at a temperature up to 3000°C in a non-oxidizing atmosphere while it is under a stress of up to about 100,000 psi.

8. A continuous process for making polyacetylene fiber as in claim 1, where oxygen is continuously passed into the solution of step (1) and the mixture is continuously stirred.

* * * * *